(12) United States Patent
Rath

(10) Patent No.: US 10,552,023 B2
(45) Date of Patent: Feb. 4, 2020

(54) USER INTERFACE EXTENSIONS

(71) Applicant: SAP SE, Walldorf (DE)

(72) Inventor: Ralf M. Rath, Walldorf (DE)

(73) Assignee: SAP SE, Walldorf (DE)

( * ) Notice: Subject to any disclaimer, the term of this patent is extended or adjusted under 35 U.S.C. 154(b) by 394 days.

(21) Appl. No.: 15/361,568

(22) Filed: Nov. 28, 2016

(65) Prior Publication Data

US 2018/0150209 A1    May 31, 2018

(51) Int. Cl.
*G06F 9/44* (2018.01)
*G06F 3/0484* (2013.01)
*G06F 3/0482* (2013.01)
*H04L 29/08* (2006.01)

(52) U.S. Cl.
CPC ........ *G06F 3/04847* (2013.01); *G06F 3/0482* (2013.01); *H04L 67/16* (2013.01)

(58) Field of Classification Search
CPC ..... G06F 8/34; G06F 8/33; G06F 8/20; G06F 8/71; G06F 9/4446
USPC .................................................. 717/102–113
See application file for complete search history.

(56) References Cited

U.S. PATENT DOCUMENTS

2005/0005259 A1*  1/2005  Avery ................... G06F 9/5038
                                                                  717/103
2007/0113191 A1*  5/2007  Keller ................... G06F 3/0481
                                                                  715/752

* cited by examiner

*Primary Examiner* — Chuck O Kendall
(74) *Attorney, Agent, or Firm* — Mintz Levin Cohn Ferris Glovsky and Popeo, P.C.

(57) ABSTRACT

A predefined user interface definition specifying a first service is accessed in persistent storage. The user interface definition includes an extension including a fragment definition specifying a second service. First content is retrieved from the first service according to the user interface definition. Second content is retrieved from the second service according to the fragment definition. A user interface is rendered in a display space according to the predefined user interface definition and including the first content and the second content. At least one of the accessing, the retrieving first content, the retrieving second content, and the rendering is performed by at least one data processor forming part of at least one computing system. Related apparatus, systems, techniques and articles are also described.

19 Claims, 8 Drawing Sheets

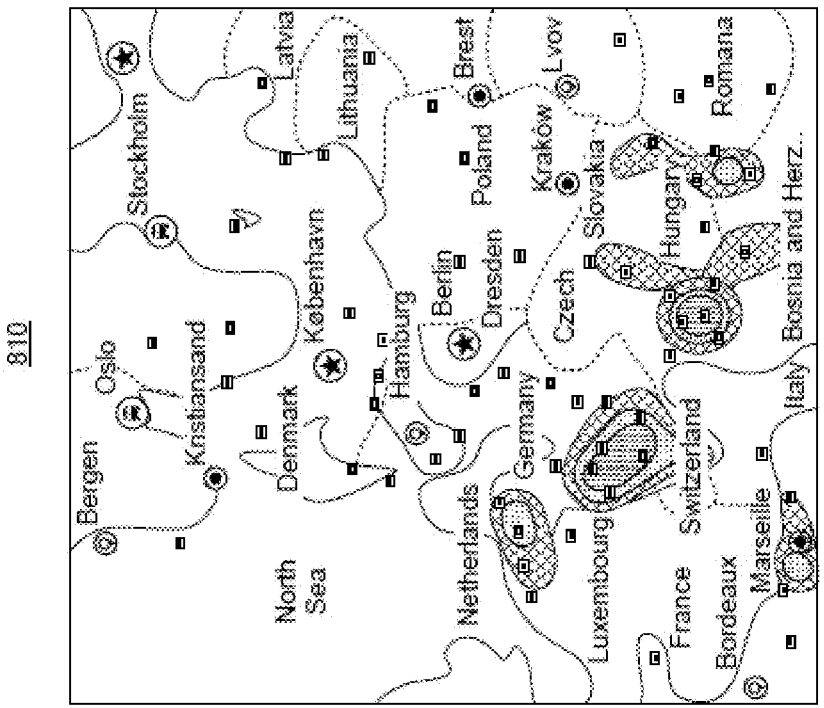
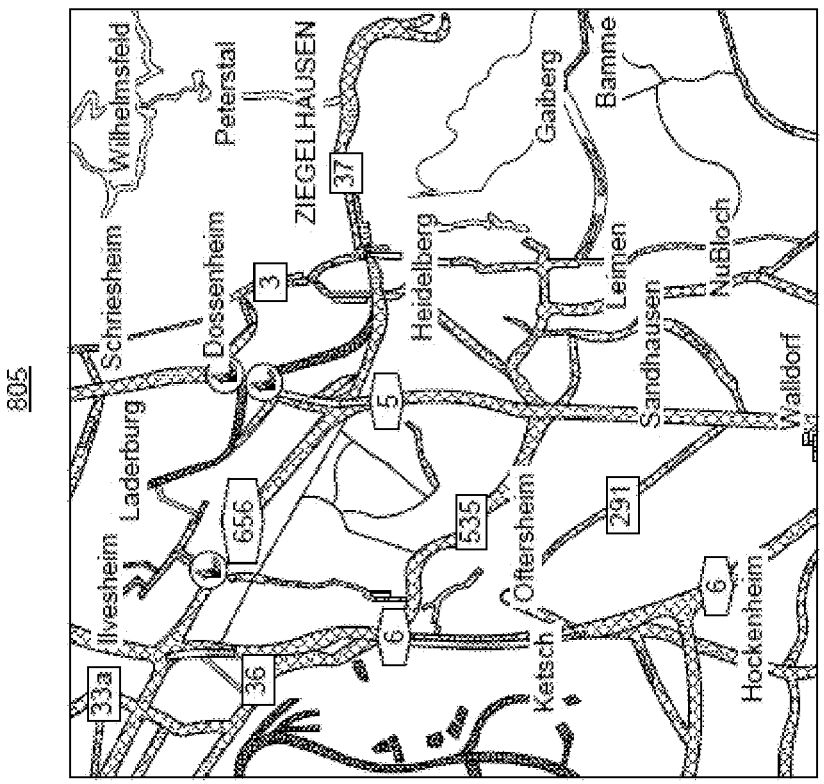
FIG. 8

USER INTERFACE EXTENSIONS

TECHNICAL FIELD

The subject matter described herein relates to user interface extensions, for example, for integrating data sources and services into user interfaces.

BACKGROUND

Enterprise software systems can include computer software used to satisfy the needs of an organization rather than individual users. Services provided by enterprise software can include business-oriented tools such as online shopping, online payment processing, interactive product catalogue, automated billing systems, security, enterprise content management, IT service management, customer relationship management, enterprise resource planning, business intelligence, project management, collaboration, human resource management, manufacturing, occupational health, enterprise application integration, enterprise forms automation, and the like. As enterprises have similar departments and systems in common, enterprise software is often available as a suite of customizable programs. Generally, the complexity of these tools requires specialist capabilities and specific knowledge.

A software application (e.g., an enterprise software solution) typically provides only 80 to 90 percent of a customer's needs. Customizing the software to meet the remaining 10 to 20 percent of the customer's needs often costs as much as, if not more than, meeting the first 80 to 90 percent. These costs are often expended integrating external data sources and/or functionalities into the application and coupling information from different enterprise services. Consultants may be required and resources are expended in order to educate users and extend the application. Often development is needed to integrate additional functionality.

SUMMARY

In an aspect, a predefined user interface definition specifying a first service is accessed in persistent storage. The user interface definition includes an extension including a fragment definition specifying a second service. First content is retrieved from the first service according to the user interface definition. Second content is retrieved from the second service according to the fragment definition. A user interface is rendered in a display space according to the predefined user interface definition and including the first content and the second content. At least one of the accessing, the retrieving first content, the retrieving second content, and the rendering is performed by at least one data processor forming part of at least one computing system.

One or more of the following features can be included in any feasible combination. A control can be instantiated according to the predefined user interface definition. The retrieving the first content, the retrieving the second content, and the rendering the user interface can be performed at least by the control. The user interface fragment can be inserted into the user definition in response to a request to include the extension in the user interface. The first service can be local to an enterprise software system and the second service can be external to the enterprise software system. The fragment definition can further specify data required by the second service to provide the second content. Retrieving the second content from the second service can include retrieving the required data from a third service and providing the required data to the second service. The first service and the third service can be local to an enterprise software system and the second service can be external to the enterprise software system. The first service and the third service can be the same service.

A request can be received to add the extension to the user interface definition. The user interface fragment definition can be inserted into the persisted user interface definition. The user interface fragment definition can specify that the second service requires at least a portion of the first content to provide the second content. The first content can include entries in a table and the second content can include additional entries extending the table. At least one of the first service and the second service can be a data repository.

Data can be received characterizing user selection of the second content. Additional content can be requested from the second service based on the user selection of the second content. A second fragment definition can be received from the second service. The second fragment definition can be inserted into the predefined user interface definition.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 8 is an illustration of external content in the form of traffic and weather data overlaid on a map.

Like reference symbols in the various drawings indicate like elements.

DETAILED DESCRIPTION

In some implementations, the current subject matter provides for dynamic extension of existing applications by providing extensions for integrating data sources and services into existing user interfaces. The applications can form part of an enterprise software system and the integrated data sources and/or services can be external to the enterprise software system. This enables customers to extend applications, which may only meet some of their needs, to meet more of their needs and without a significant investment. Inclusion of the extension in the user interface need not be at the time the application is initially purchased, but can be dynamic in that the extensions can be added, removed, and/or changed during use of the application.

For example, the current subject matter can enable a customer using an existing software application to decide that they need a new tool or functionality, search through a catalog of available extensions, select a desired extension, and cause that extension to be inserted into the application user interface such that interface controls are bound to local and/or external services. The extensions may be created by external parties (e.g., partners) and require data or processing that is external to the enterprise software system. The extended application can then be executed with the extension and without having to alter the existing enterprise software system. Thus, from the perspective of the customer, when they decide they need additional functionality or data, no further development is required. From the perspective of the application developer or system administrator, additional tools, data, and/or functionality can be integrated into the existing application user interface without further development.

Figure 1:
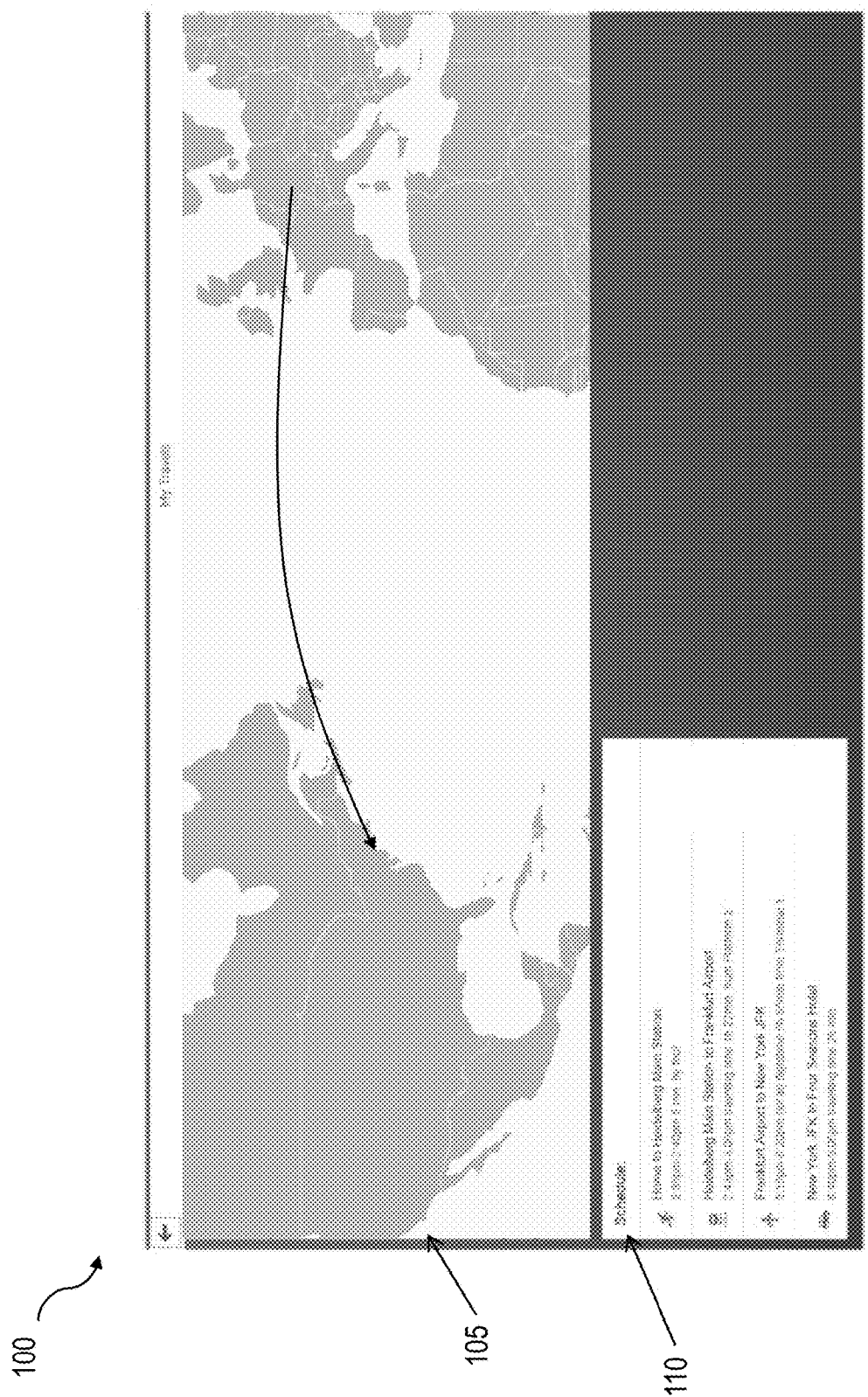
FIG. 1 is a graphical depiction of a rendered graphical user interface prior to inclusion of an extension.

FIG. 1 is a graphical depiction of a rendered example graphical user interface 100 prior to inclusion of an extension. The example user interface 100 is part of a calendar application that aids in planning and visualizing travel. The user interface 100 includes different content sections including map 105, schedule 110. Map 105 is content that illustrates planned travel overlaid on a map. Schedule 110 is content illustrating the planned travel.

Figure 2:
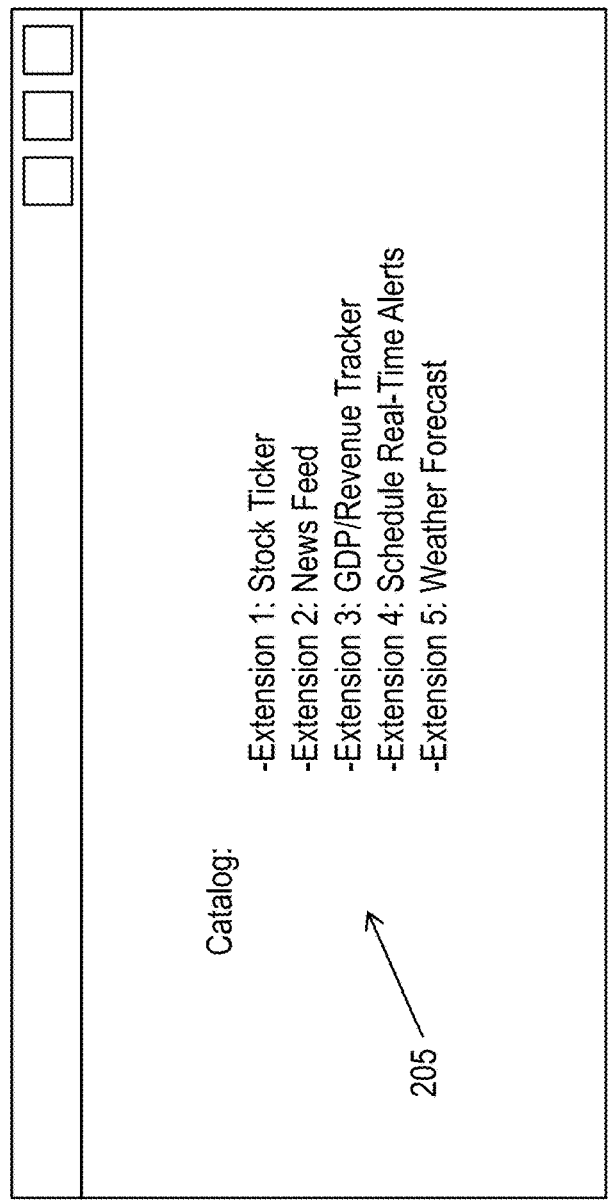
FIG. 2 is a graphical illustration of an example catalog.

To extend the functionality of the calendar application a user may visit a store or catalog of available extensions. FIG. 2 is a graphical illustration of an example catalog 200. The catalog 200 includes a list of available extensions 205. The available extensions 205 can be developed by an administrator, customer, partner or third party and can access services that are external to a larger enterprise software system of which the calendar application is a component. The external services may be cloud based. For example, a calendar application can have local access to train and flight schedules, but not up-to-date information regarding train or flight delays. In contrast, an extended interface can access external content, such as real-time train and airplane delay information.

Figure 3:
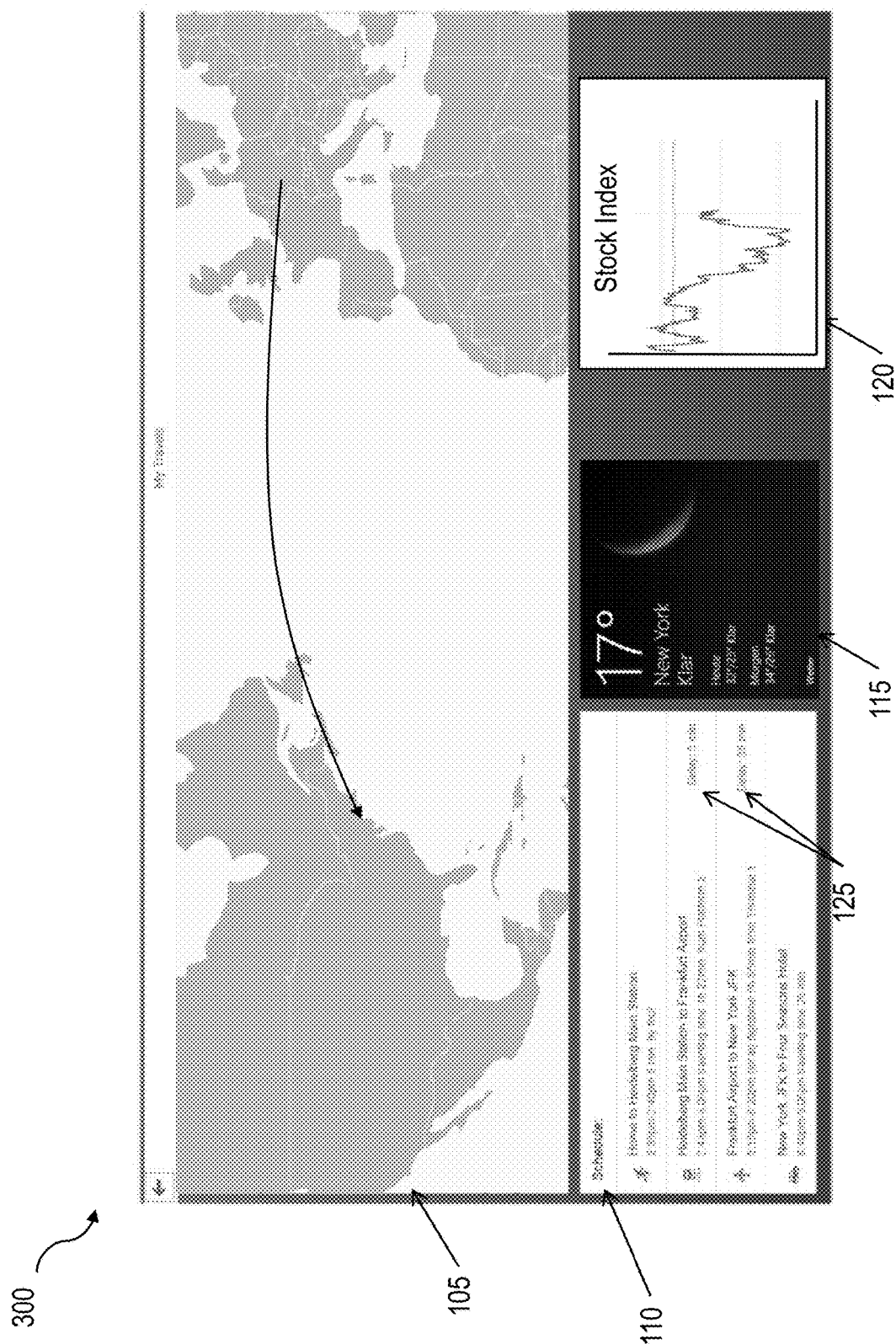
FIG. 3 is a graphical depiction of an extended interface.

A user can browse catalog 200 and select one or more desired extensions for inclusion in the example user interface 100. As described more fully below with respect to FIG. 4, a fragment definition specifying the necessary service for providing the new content can be inserted into a previously persisted definition of the existing user interface 100. The resulting example extended interface 300 as rendered is shown in FIG. 3. The extended interface 300 includes additional content 125, which specifies the delay for the train and airplane legs of the schedule. The extended interface 300 also includes additional content 120 and 115, which is a stock ticker providing recent stock price information and weather information providing current weather at the destination, respectively. In this manner, additional tools and functionality can extend existing user interfaces without need for additional development of the calendar application.

As illustrated in FIG. 3, there can be different levels of integration of content. New content can be a side-by-side "mash up" of unrelated content without a semantic link between the content (e.g., an extension without context such as a stock ticker next to a travel schedule). New content can be an extension with page context such that new content is related to the previously included data (for example, providing weather data for a destination city). Additionally, new content can be integrated within an existing control, such as adding train and flight delay info to a schedule.

Figure 4:
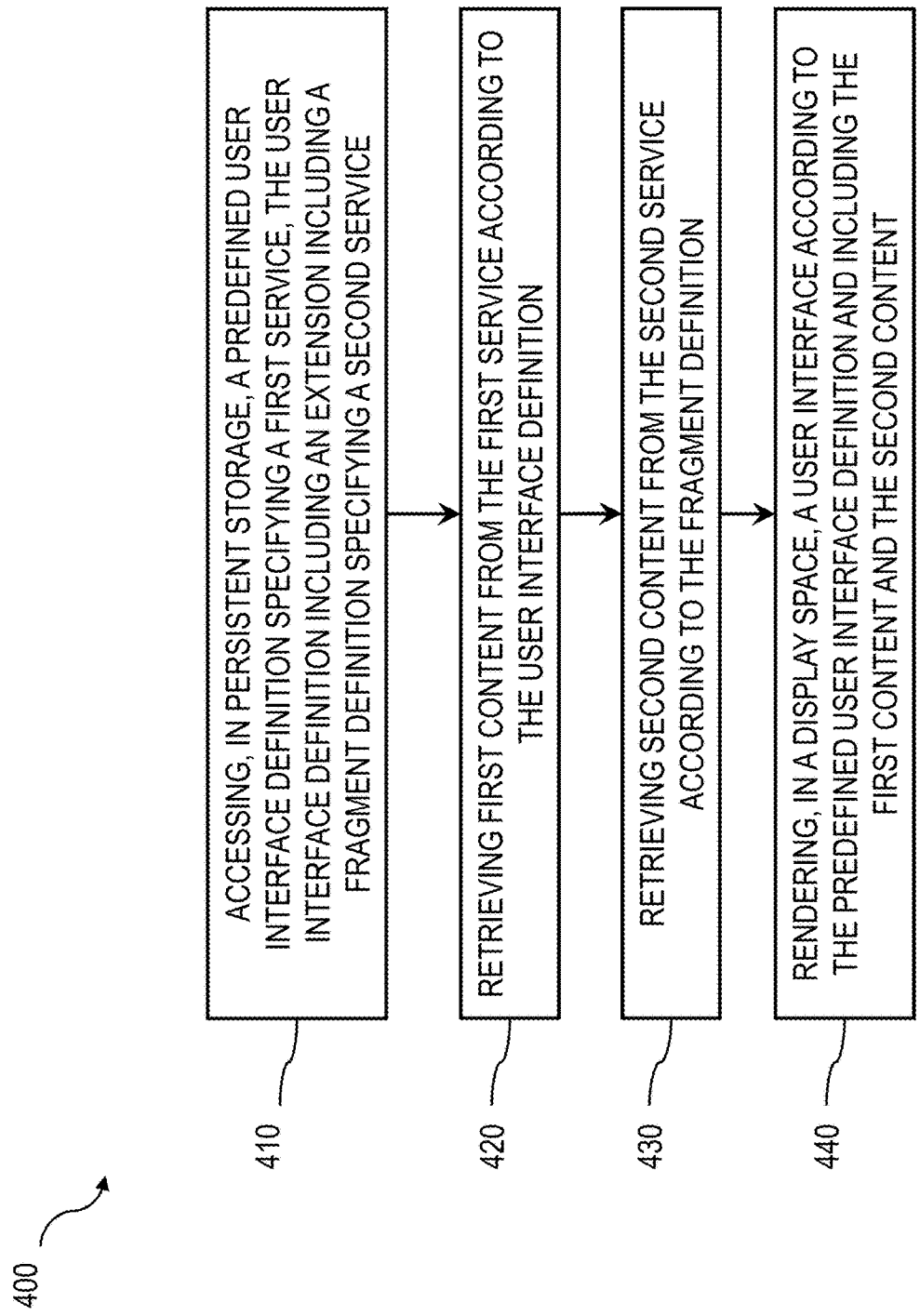
FIG. 4 is a process flow diagram illustrating an example method for extending a user interface.

FIG. 4 is a process flow diagram illustrating an example method 400 for extending a user interface. The method 400 can enable integration of external data sources and services (e.g., external cloud-based resources) into an enterprise software system and can enable coupling of information from different enterprise software system components.

At 410, a predefined user interface definition can be accessed in persistent storage. The predefined user interface definition may be, for example, an extended markup language (XML) file specifying at least one control, layout, content, and services required by a control to render the user interface to a user. The predefined user interface definition can specify one or more services from which a control associated with the user interface can retrieve content. For example, in a transportation management enterprise software application, the predefined user interface definition can specify that a local (e.g., internal to the enterprise system) service be accessed that can provide information regarding company delivery trucks, their destinations, routes, and the like. As another example, in a business analysis application, the predefined user interface definition can specify that a local service be accessed that can provide information regarding an industry's historical revenue.

The user interface definition can include an extension, which can be a fragment definition specifying another service. The fragment definition can be, for example, a fragment or snippet of XML that was previously inserted into the predefined user interface definition. The fragment definition can have been previously inserted into the user interface definition as a result of a user requesting, using a catalog of available extensions, to extend an existing user interface with one of the available extensions.

The fragment definition can specify a service that is local (e.g., internal) or external to an enterprise software system. The fragment definition can define a new control and/or modify an existing control.

At 420, content can be retrieved from the first service according to the user interface definition. In the transportation management enterprise software application example discussed above, a list of trucks, their destinations, routes, and the like can be retrieved. In the business analysis application example, the first service can be an enterprise database warehouse system including one or more repositories storing the industry's historical revenue.

At 430, content can be retrieved from the second service according to the fragment definition. In the transportation management enterprise software application example discussed above, the second service can provide, for example, current traffic data. The second service can be external to the transportation management enterprise software application (e.g., an external cloud-based service). In the business analysis application example, the second service can provide gross domestic product (GDP) information from an external (e.g., public) database.

At 440, the user interface is rendered according to the predefined user interface definition and including the retrieved content. The user interface can be rendered by rendering the retrieved content adjacently and/or by overlaying the content retrieved from the second service on top of the content retrieved from the first service (e.g., overlaying traffic data on top of truck routes, extending tables with statistical data, and the like). In some implementations, additional processing may be performed on the content retrieved from the first service and/or the content retrieved from the second service before rendering in the user interface. The user interface may be rendered in a display space.

FIG. 8 is an illustration of external content displayed overlaid on a map of a transportation management planning application. At 805, traffic data is illustrated on top of an existing map. At 810, weather data is illustrated on top of an existing map. The extended application enables a user to view not only truck routes, but traffic, and weather enabling enhanced decision making in scheduling additional trucks, canceling trucks, modifying routes, and the like.

The fragment definition can specify data that is required by the second service in order to provide the second content. For example, in the transportation management application example, the second service providing traffic data can require the truck routes in order to provide traffic specific to those routes. The required data can be retrieved from the first service and/or a third service and sent to the second service as part of the retrieval of content from the second service. In implementations where the second service is external, security issues may arise where sending data or content external to the enterprise software system may be undesirable. In some implementations, when selecting an extension from the catalog, a user may be prompted with required permissions authorizing sending of content external to the enterprise software system.

During build-time, a request to add the extension to the user interface can be received. The extension can be adapted for the particular user interface and the user interface fragment definition can be inserted into a persisted user interface definition (e.g., the existing interface). This can include, for example, inserting an XML fragment into a previously persisted XML interface definition.

In some implementations, in order to implement the user interface, one or more controls can be instantiated according to the predefined user interface definition. For example, javascript can instantiate a control using the predefined user interface definition. The instantiated control can be dynamic such that the control instantiates new controls according to the user interface definition in the fragment responds to user interaction by, for example, altering the control or instantiated another control.

The controls can be bound to the first and/or second content or services. For example, a control can bind to a table structure and display the same number of rows as in the underlying structure. Controls can be software components that a computer user interacts with through direct manipulation to read or edit information about an application. Some controls can enable user interaction (e.g., buttons) and some controls can act as containers for displaying content. The controls can be the software components that retrieve the content from the first service and second service and enable rendering of the user interface.

Extensions can be control-type specific. For example, some extensions can apply to tables (e.g., by adding a new column or row to a table). Some extensions can apply to maps (e.g., by overlaying weather or traffic data onto a map). Other extension and control-type bindings are possible.

Extensions can define their input parameters. For example, a GDP service requires one or more years for which to provide the GDP. The required year can be provided by a table containing the revenue per year (the table can be extended by the extension). A revenue forecast extension can depend on historic revenue and year. The table can provide these and can be extended by the forecast.

Services can include a software function or a set of software functions (such as the retrieval of specified information or the execution of a set of operations) that can be reused by different clients for different purposes. Services can cloud-based.

User interactivity with the extended user interface can be provided. For example, if content is displayed to the user and the user selects or otherwise interacts with the content (e.g., zooms into a map, selects a data point on a plot, and the like), then additional content can be retrieved from the first and/or second service and rendered in the user interface. For example, if a user selects content retrieved from the second service such as a table entry, then additional data associated with the selected content can be retrieved from the second service. The additional data can include statistics, attributes, metadata, description, and the like.

Likewise, user interactivity can be provided based on user interaction with a control. In some implementations, the second service can provide a user interface fragment definition for insertion into the user interface definition. This can enable user interactivity that instantiates new controls or extends existing controls from an external service. The external service can provide a new control (or extension of an existing control) that extends functionality without requiring additional integration. As an example, a user may select a "more details" button, which causes requesting of additional content from the second service. The second service can send the additional content and a fragment definition that characterizes a new control or an extension to an existing control. The fragment definition can be inserted into the user interface definition that is persisted in memory and the updated user interface can be rendered with additional content. When the user interface is updated, it can display the "more details" in a new control (e.g., a new table) or as a modification of an existing control (e.g., a new column in a table). Thus, a local or external service can also create new controls on a UI without requiring additional integration.

Figure 5:
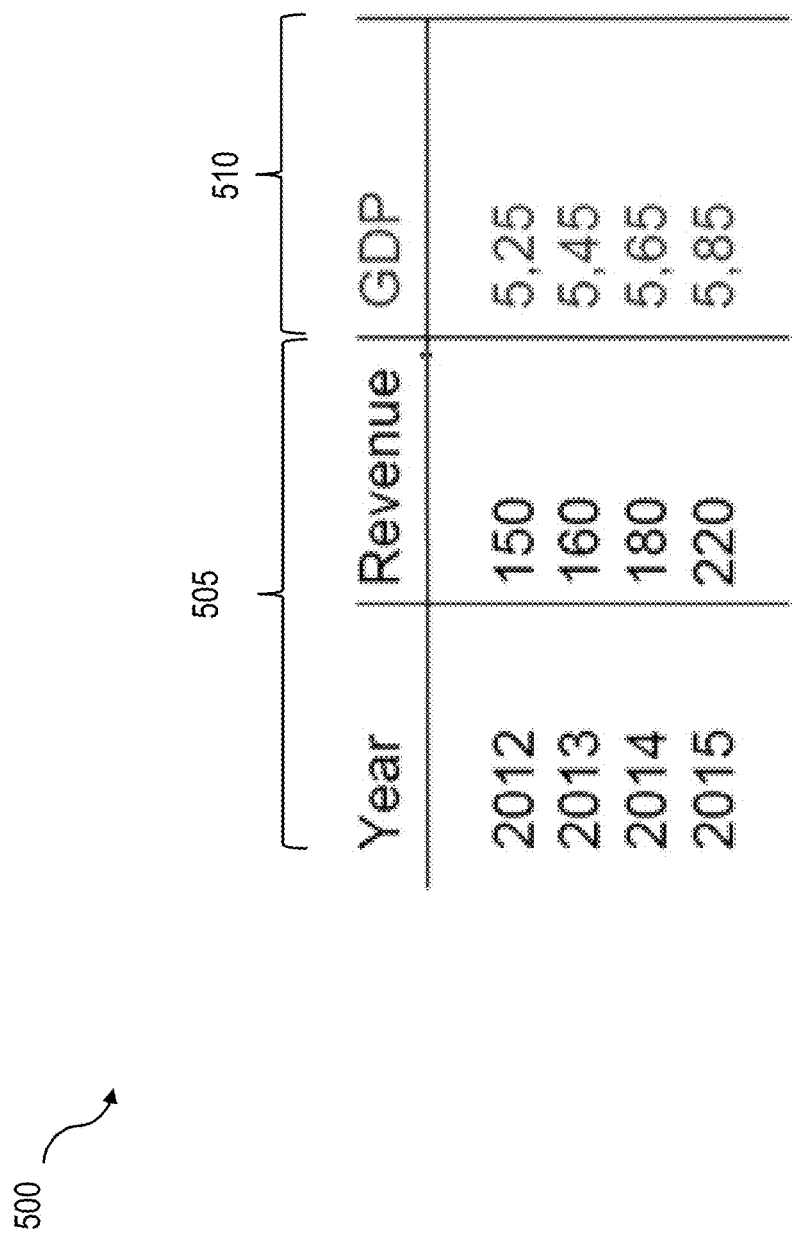
FIG. 5 includes two tables illustrating extension of a table using the current subject matter.

As another example, content from the first service can include entries in a table, and the content from the second service can include additional entries extending the table. FIG. 5 includes two tables illustrating extension of a table using the current subject matter.

Prior to extension, the first table 500 includes a column for year and revenue (shown at 505). The year and revenue data can be provided by a first service local to a business management enterprise software system. The user interface can be extended by inserting a user interface fragment that defines a second service, which, when provided with the year data, provides the associated GDP data. The GDP data can extend the table by providing the GDP column (shown at 510). When the table is rendered by a control, all three columns can be displayed.

Figure 6:
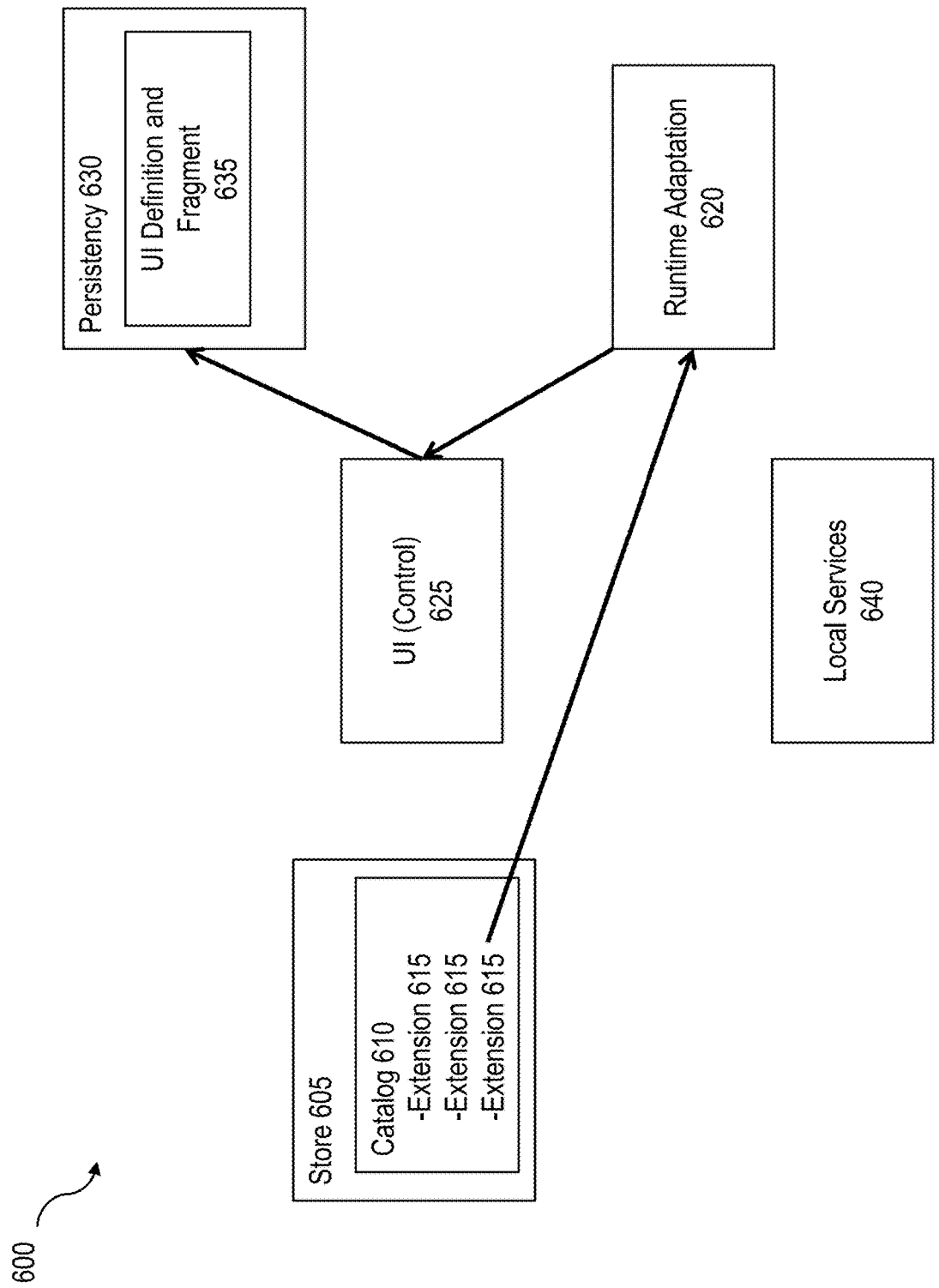
FIG. 6 is a system block diagram illustrating an example enterprise software system with user interface extension capabilities according to the current subject matter.

FIG. 6 is a system block diagram illustrating an example enterprise software system 600 with user interface extension capabilities according to the current subject matter. Data flow is illustrated at build-time. The example system 600 includes a store 605 having a catalog 610 of predefined extensions 615, a runtime adaptation module 620, user interface control 625, persistency 630 storing user interface definition 635, and local services 640.

At build-time, a user can select an existing user interface control on a rendered user interface. By selecting the user interface control, they can visit store 605 and view catalog 610 of extensions. In some implementations, the catalog 610 of extensions can be filtered based on extensions that are available to the selected control. Extensions can be considered available based on whether the selected control or user interface can provide required inputs. For example, if a map control displaying geographic information is selected, extensions that require revenue data can be filtered out. Extensions can be considered available based on a security level associated with the user. For example, an administrator can require that a user not extend their user interfaces using certain external services in order to meet company compliance, secure proprietary information, and the like.

The store 605 and catalog 610 can provide a user interface to change a given application. After selecting one or more extensions 615, the selected extension 615 is provided to runtime adaptation module 620. Adaptation module 620 allows the user to configure the control of a user interface fragment, for example, by changing control parameters such as position, color and the like. The user interface fragment is inserted into user interface and/or control 625, by, for example, appending the fragment to or modifying the previously persisted user interface definition 635. In some implementations, the user interface fragment can be associated with the previously persisted user interface definition 635 by storing the fragment as a separate modification file that is used during control instantiation or execution for modifying the control during run-time. The modified user interface definition can be stored in persistency 630.

In some implementations, the user that can select an extension is a key user. A key user can be an administrator and subject matter expert role within a given enterprise software solution. The key user can decide who within their organization can view the extension content and when. The key user can define rules setting access permissions for extension use. In some implementations, it can be determined whether the key user has a license for a selected extension and, if not, the key user can be prompted to purchase a license for the extension.

In some implementations, the store 605 and catalog 610 can provide a selectable list of applications and extensions. Extensions can be provided (e.g., developed and added to catalog) by an enterprise software solution provider, customer landscape, partner content, and the like. An extension can be described by metadata including a description, version, type, and the like. Backend software dependencies and security level can be specified. A tiered security approach having multiple security levels can be used because different users may be able to utilize or share different information. For example, a year (e.g., 2016) can be transmitted to an external service (operated by a third party) because it is not sensitive information whereas revenue numbers for forecasting should not be made available to third parties.

Because security issues may arise where sending data or content external to the enterprise software system, the key user may be prompted with permissions when selecting an extension from the catalog. The permissions can be to authorize sending of content external to the enterprise software system. External services (e.g., entry points) can be listed. This information can enable the key user to select an appropriate extension.

A content administrator can define (e.g., in dependency of security, pricing, and/or compliance) which items are visible for the key user. The administrator can add and define landscape extensions. The catalog can check the status of a license for a given extension. In some implementations, an extension control or "cockpit" can be provided. The extension control can show which extensions are in use by application, roles, users, and overall.

Figure 7:
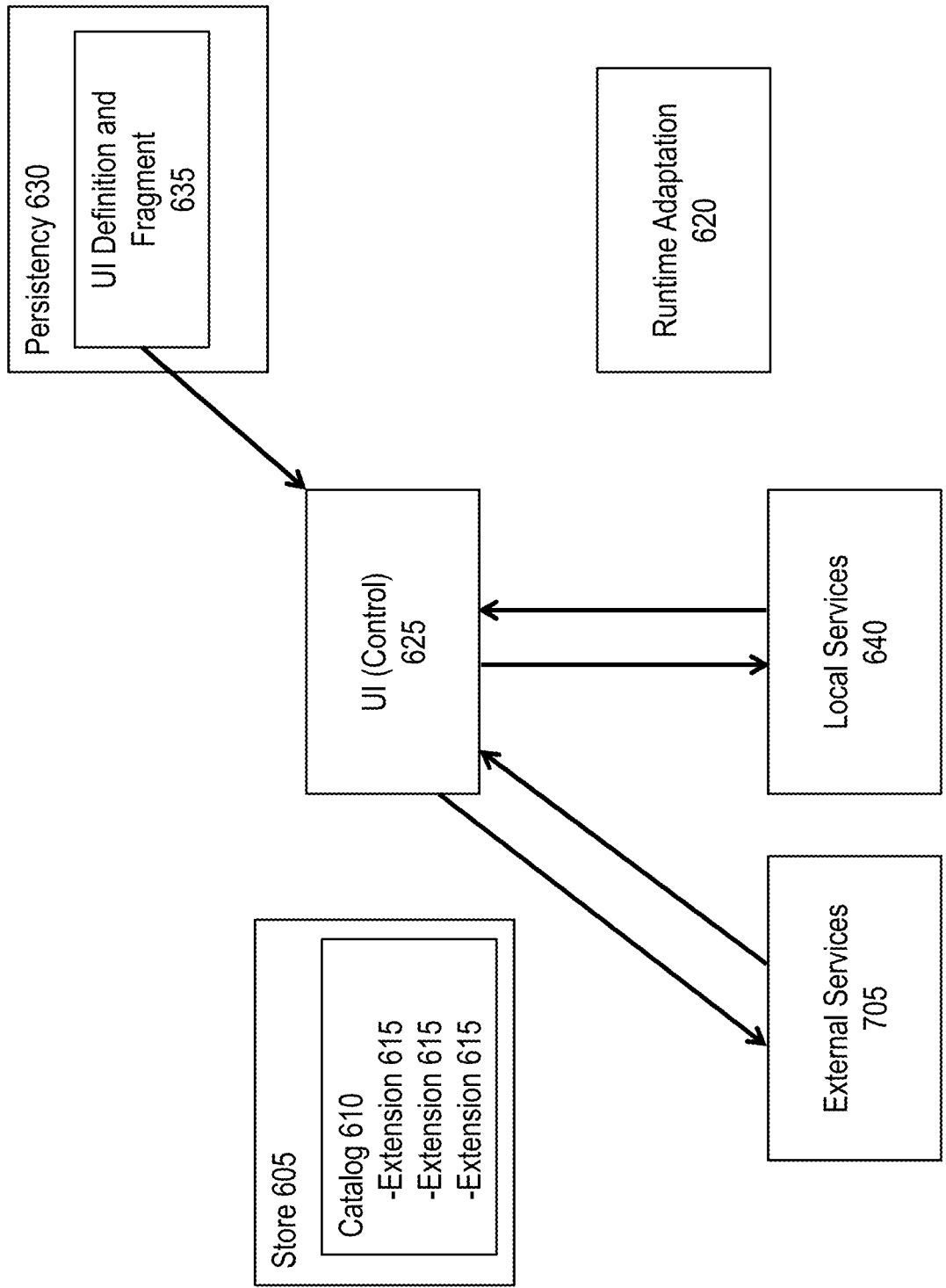
FIG. 7 is a system block diagram illustrating the example enterprise software system along with external services.

FIG. 7 is a system block diagram illustrating the example enterprise software system 600 along with external services 705. Data flow during runtime is illustrated. Local services 640 can include one or more services that are considered part of the enterprise software system 600 (e.g., internal to the enterprise system). External services can include services that are not within the enterprise software system 600 and may be, for example, provided by partners or third parties. The services can include software functions (such as the retrieval of specified information or the execution of a set of operations).

At runtime, control 625 accesses the user interface definition including fragment 635 from persistency 630. Based on the content of the user interface definition and fragment 635, control 625 retrieves content from local services 640 and/or external services 705. Control 625 can provide data retrieved from one service to another service. The data dependency can be specified in the user interface definition 635. Once content is retrieved, control 625 can render, in a display space, the content according to the user interface definition. In some implementations, additional content can be retrieved based on user interaction with the user interface. Additional fragments can also be retrieved from the local services 640 or external services 705 based on user interaction with the user interface. The additional retrieved fragments can be inserted into the user interface definition.

User interface definitions can include XML files, JavaScript Object Notation (JSON), HyperText Markup Language (HTML), and the like.

In some implementations, content received from the first service can be received from one server and content from the second service can be received from another server. In some implementations, both content from the first service and content from the second service can be received from the same server. For example, it is possible to add customers from a CRM database from the same server that is providing trucks on a map in a transportation management application. In some implementations, external services can be re-routed through the enterprise server to avoid browser popups/messages The subject matter described herein provides many technical advantages. For example, because cloud-based extensions are difficult and/or costly to incorporate into user interfaces, the current subject matter enables enhancing software applications with limited development costs. Further, the current subject matter enables a user to add external or additional local content to an application enabling dynamic extension of enterprise software applications. Customers can add their information technology landscape content and services to existing enterprise software applications. Partners can add their services or content to a catalog and provide it as part of an enterprise resource planning software environment.

The current subject matter enables the creation of a market for extensions to be provided to business partners cheaply and efficiently. The current subject matter enables dynamic reconfiguration of user interfaces that enables extensions to be provided on a subscription basis. Subscription basis is possible because an interface, once extended, can have the extension removed without substantial changes to the underlying software. This allows for de-integration of functionality from an enterprise software solution. Dynamic integration and de-integration allows customers and business partners to tailor their enterprise software solutions to needs that may be changing over time by adding or removing extensions on a need basis (and thus paying on a need basis).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
accessing, in persistent storage, a predefined user interface definition specifying a first service, the user interface definition including an extension including a fragment definition specifying a second service;
retrieving first content from the first service according to the user interface definition;
receiving a request to include the extension in the user interface definition;
instantiating a control according to the predefined user interface definition;
retrieving second content from the second service according to the fragment definition; and
rendering, in a display space, a user interface according to the predefined user interface definition and including the first content and the second content;
wherein at least one of the accessing, the retrieving first content, the retrieving second content, and the rendering is performed by at least one data processor forming part of at least one computing system;
wherein the user interface fragment definition is inserted into the predefined user interface definition in response to the request to include the extension in the user interface;

wherein the first service is local to an enterprise software system and the second service is external to the enterprise software system;

wherein the retrieving the first content, the retrieving the second content, and the rendering the user interface is performed at least by the control;

wherein the fragment definition further specifies data required by the second service to provide the second content; and wherein retrieving the second content from the second service includes retrieving the required data from a third service and providing the required data to the second service, the first service and the third service being local to an enterprise software system and the second service being external to the enterprise software system.

2. The method of claim 1, further comprising:
instantiating a control according to the predefined user interface definition, wherein the retrieving the first content, the retrieving the second content, and the rendering the user interface is performed at least by the control.

3. The method of claim 1, wherein the first service is local to an enterprise software system and the second service is external to the enterprise software system.

4. The method of claim 1, wherein the fragment definition further specifies data required by the second service to provide the second content, wherein retrieving the second content from the second service includes retrieving the required data from a third service and providing the required data to the second service, the first service and the third service being local to an enterprise software system and the second service being external to the enterprise software system.

5. The method of claim 4, wherein the first service and the third service are the same service.

6. The method of claim 1, further comprising:
receiving a request to add the extension to the user interface definition; and
inserting, into the persisted user interface definition, the user interface fragment definition.

7. The method of claim 1, wherein the user interface fragment definition specifies that the second service requires at least a portion of the first content to provide the second content.

8. The method of claim 1, wherein the first content includes entries in a table, the second content includes additional entries extending the table.

9. The method of claim 1, wherein at least one of the first service and the second service is a data repository.

10. The method of claim 1, further comprising:
receiving data characterizing user selection of the second content;
requesting additional content from the second service based on the user selection of the second content;
receiving a second fragment definition from the second service; and
inserting the second fragment definition into the predefined user interface definition.

11. A system comprising:
at least one data processor;
memory storing instructions which, when executed by the at least one data processor, causes the at least one data processor to perform operations comprising:
accessing, in persistent storage, a predefined user interface definition specifying a first service, the user interface definition including an extension including a fragment definition specifying a second service;
retrieving first content from the first service according to the user interface definition;
receiving a request to include the extension in the user interface definition;
instantiating a control according to the predefined user interface definition;
retrieving second content from the second service according to the fragment definition; and
rendering, in a display space, a user interface according to the predefined user interface definition and including the first content and the second content;
wherein the user interface fragment is inserted into the predefined user interface definition in response to the request to include the extension in the user interface;
wherein the first service is local to an enterprise software system and the second service is external to the enterprise software system;
wherein the retrieving the first content, the retrieving the second content, and the rendering the user interface is performed at least by the control;
wherein the fragment definition further specifies data required by the second service to provide the second content; and
wherein retrieving the second content from the second service includes retrieving the required data from a third service and providing the required data to the second service, the first service and the third service being local to an enterprise software system and the second service being external to the enterprise software system.

12. The system of claim 11, the operations further comprising:
instantiating a control according to the predefined user interface definition, wherein the retrieving the first content, the retrieving the second content, and the rendering the user interface is performed at least by the control.

13. The system of claim 11, wherein the first service is local to an enterprise software system and the second service is external to the enterprise software system.

14. The system of claim 11, wherein the fragment definition further specifies data required by the second service to provide the second content, wherein retrieving the second content from the second service includes retrieving the required data from a third service and providing the required data to the second service, the first service and the third service being local to an enterprise software system and the second service being external to the enterprise software system.

15. A non-transitory computer program product storing instructions, which when executed by at least one data processor of at least one computing system, implement operations comprising:
accessing, in persistent storage, a predefined user interface definition specifying a first service, the user interface definition including an extension including a fragment definition specifying a second service;
retrieving first content from the first service according to the user interface definition;
receiving a request to include the extension in the user interface definition;
instantiating a control according to the predefined user interface definition;
retrieving second content from the second service according to the fragment definition; and rendering, in a display space, a user interface according to the predefined user interface definition and including the first content and the second content;

wherein the user interface fragment is inserted into the predefined user interface definition in response to the request to include the extension in the user interface;

wherein the first service is local to an enterprise software system and the second service is external to the enterprise software system;

wherein the retrieving the first content, the retrieving the second content, and the rendering the user interface is performed at least by the control;

wherein the fragment definition further specifies data required by the second service to provide the second content; and wherein retrieving the second content from the second service includes retrieving the required data from a third service and providing the required data to the second service, the first service and the third service being local to an enterprise software system and the second service being external to the enterprise software system.

16. The non-transitory computer program product of claim 15, the operations further comprising:

instantiating a control according to the predefined user interface definition, wherein the retrieving the first content, the retrieving the second content, and the rendering the user interface is performed at least by the control.

17. The non-transitory computer program product of claim 15, wherein the fragment definition further specifies data required by the second service to provide the second content, wherein retrieving the second content from the second service includes retrieving the required data from a third service and providing the required data to the second service, the first service and the third service being local to an enterprise software system and the second service being external to the enterprise software system.

18. The method of claim 1, wherein the extension is selected from a list of available extensions.

19. The method of claim 1, wherein the extension is added during use of an enterprise software system executing the first service.

* * * * *